UNITED STATES PATENT OFFICE.

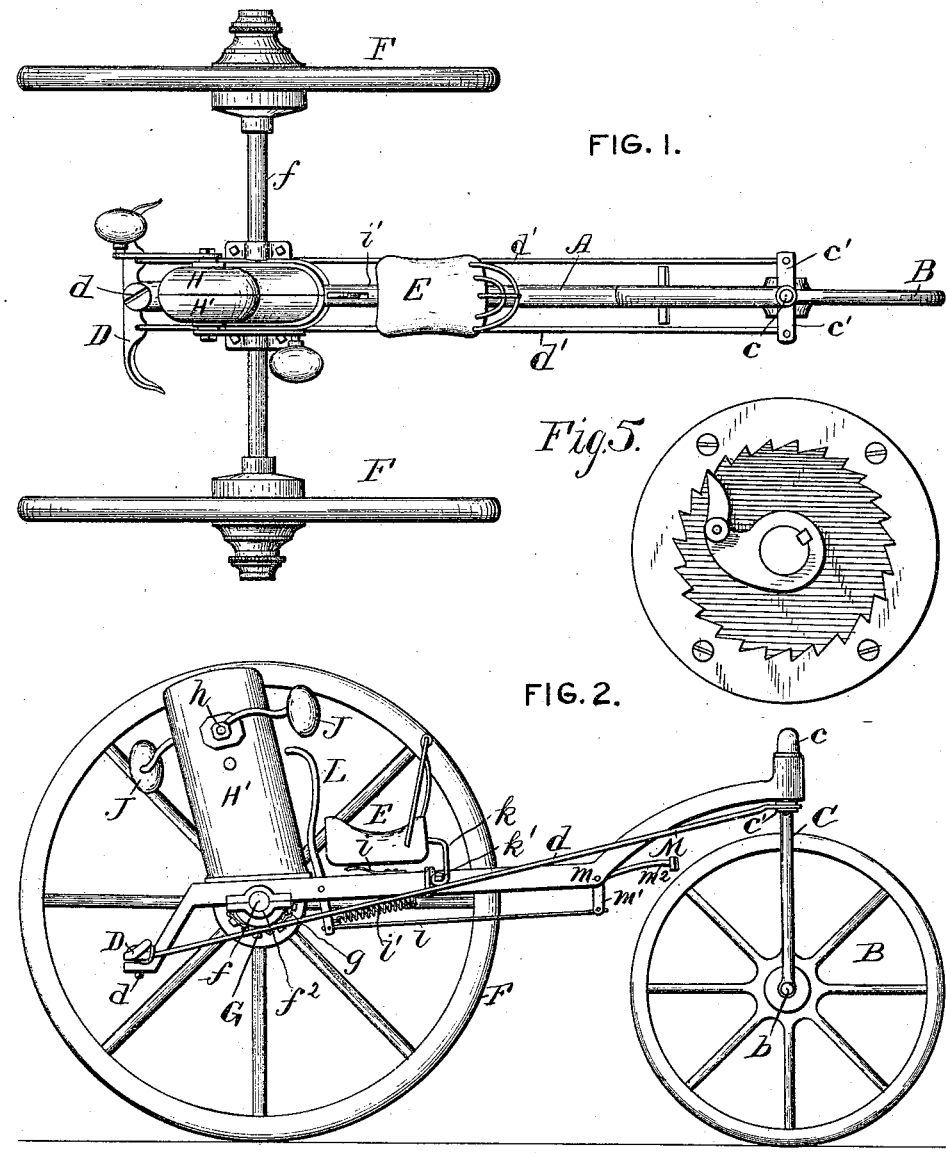

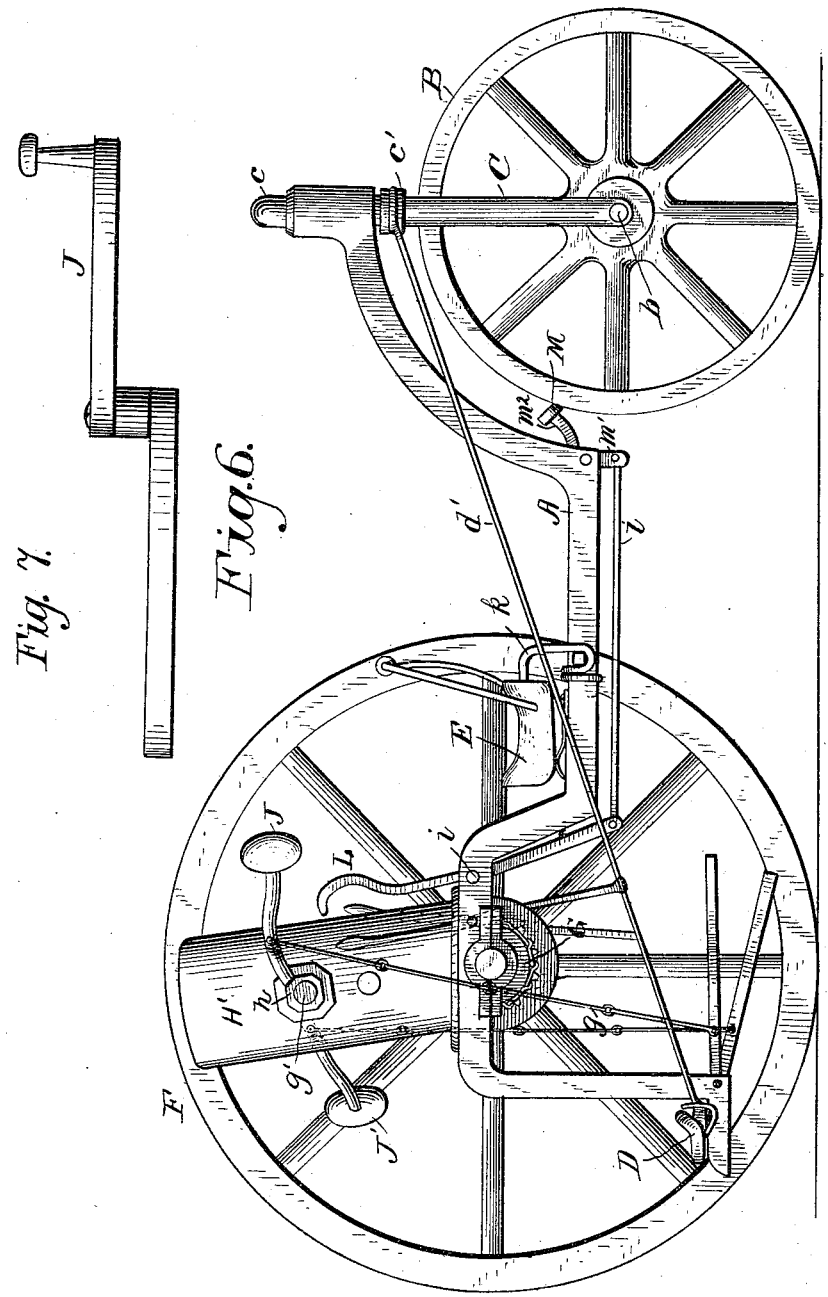

JOHN B. FUNK, OF COLUMBIA, ASSIGNOR OF ONE-HALF TO EZEKIEL LIGHT, OF LEBANON, PENNSYLVANIA.

TRICYCLE.

SPECIFICATION forming part of Letters Patent No. 336,226, dated February 16, 1886.

Application filed February 18, 1885. Serial No. 156,284. (No model.)

*To all whom it may concern:*

Be it known that I, JOHN B. FUNK, of Columbia, Lancaster county, Pennsylvania, have invented certain new and useful Improvements in Tricycles, of which the following is a specification, reference being had to the accompanying drawings, forming part hereof, in which—

Figure 1 is a plan view of my improved tricycle. Fig. 2 is a side elevation thereof. Fig. 3 is a view of one of the casings, showing the chain-gearing. Fig. 4 is a view of one of the bearings for the crank-shaft. Fig. 5 is a detail view showing the ratchet in the hub. Fig. 6 is a view in side elevation of a complete machine, showing my means for driving and steering by hand or foot, or both. Fig. 7 is a view in plan of my improved crank.

Like letters of reference mark the same parts in all the figures.

My invention relates to tricycles; and it consists in the improved construction, arrangement, and combination of parts hereinafter fully described, and then specifically pointed out in the claims.

Referring to the drawings by letter, A is the main frame of the machine, which extends centrally from a point perpendicularly above the hub of the single rear wheel to a point under or slightly in front of the front axle.

B is the single rear wheel, mounted on a short shaft, b, in the lower end of a forked frame, C, whose stem c at its top is swiveled in the rear end of the frame A.

Near the frame A, from the fork C, project two lateral arms, c', one on each side of the fork and rigidly secured thereto.

D is a pedal-bar pivoted at d to the front end of frame A, and formed suitably to receive the feet of the rider when seated in the saddle E. This pedal-bar is connected to the lateral arms c' by two rods, d', secured, respectively, to the ends of the pedal-bar and lateral arms in any suitable manner. In order to bring the end of the frame A to a suitable position to receive the pedal-bar, said frame is bent downward in front of or under the front axle.

F F' are the front wheels, mounted upon an axle, f, which has its bearings centrally between the lower side of frame A and any suitable cap, as at f'. Mounted centrally on said axle is a sprocket-wheel, G, over which is passed a drive-chain, g, which also engages a sprocket-wheel, G', mounted on a pin, g', having its bearings h in a casing composed of hollow plates H H'. These bearings are adjustable, being screwed into threaded holes in said casing, and the shaft g' extends laterally beyond the casing and bearings, and has on the ends hand-cranks J J', set diametrically opposite each other.

E is a saddle mounted on the frame A at the rear of casing H H'. This saddle is hung on a spring, k, which is secured around two laterally-projecting pins, k'—one on each side of the frame—and passes over the top of the frame A, as shown in Fig. 2. The front portion of the saddle, when occupied, rests on a spring, i, secured on top of the frame A. The frame A has an opening in size and shape to suit the bottom of the casing H H', and from this opening rearward extends a slot, i', in which is pivoted on a pin, j, a hand-lever, L, whose lower end is connected by a rod, l, with the lower arm, m', of an elbow-lever, M, pivoted in a slot in frame A by means of a pin, m, and whose upper arm, $m^2$, carries at its end a brake. The brake is kept normally out of contact with the wheel B by means of a spring, l', secured at one end to the lower end of hand-lever L and at the other to bottom of frame A.

The wheels F F' are connected to their axles by any suitable ratchet-and-pawl mechanism—such, for instance, as is shown in Fig. 5—so that it is unnecessary to operate the drawing mechanism when the vehicle is traveling by virtue of its own momentum—as, for instance, on a downgrade.

The operation and advantages of my improved tricycle may be described as follows, viz: The rider is firmly seated on a spring-saddle in the best position to use his hands and arms on the handles and exert the greatest amount of strength. His feet rest on the pedal and brace the body, at the same time bracing the support of the hind wheel and governing the direction of the vehicle. To stop it is only necessary to grasp the brake-lever, which stands directly in front and within easy reach of him, and which he operates with one hand. The casing is ornamental, and at the same time serves to keep the sprocket-wheels in place. The lower cap-bearing is not absolutely necessary. The lower end of the double casing enters an opening in the frame A, and stands slightly inclined, enabling the saddle to be placed so that it is almost over the front axle, and still room enough is left for the free action of the arms. The draft forward on the guiding-rods serves to stay the forked support of the rear wheel.

The whole device is simple, compact, and durable, and can be made at a much less cost than the devices of the same class now in use.

In Fig. 6 I have shown the main frame A in its most approved construction. Its central portion is bent downward, so that the weight of the occupant rests below the level of the front axle, and thus enables the legs to be passed under the axle to reach the pedals. It also facilitates mounting and prevents accidental pitching forward when an obstruction is struck, so that what is technically termed a "header" cannot be taken. This figure also shows my improved arrangement, whereby the machine may be driven by the foot-power of the rider and steered by the hands. This is accomplished as follows: a pair of treadles, T T', are pivoted to the front end of the frame A, and are connected by means of suitable rods or chains, $t$, to the cranks J J', these cranks being specially constructed for this purpose of two parts, $t'$ $t^2$, connected to each other by a pin, $t^3$, to which the pedal link, rod, or chain is attached. This enables the cranks to be rotated by hand or foot power, or both combined. The feet being engaged, it becomes desirable to be able to steer the machine by hand. This I accomplish by pivoting a lever, S, on each side of the machine, and connecting it at $s$ to the rod $d'$, which connects with the steering apparatus. The brake may be placed so as to act upon any part of the tire as desired, as near the vertical axis as possible being the approved position.

Fig. 7 is a plan view of the crank, constructed to receive the treadle-lever.

The frame may be of any shape or length to suit different machines or different sizes of wheels, or the taste of different riders, as to purpose or beauty.

The seat may be so arranged that more than one person may occupy the machine.

The sprocket-wheels may be made to differ in size, so as to speed up or down, as speed or power may be desired.

Having thus fully described my invention, what I claim, and desire to secure by Letters Patent, is—

1. The combination of the front axle, the main frame passing over it and forming its upper bearing, the casings H H', the sprocket-wheels G G', and the chain $g$, all arranged as shown and described, whereby the relative position of the axle and main frame is maintained by the chain, as set forth.

2. In combination, the main frame, the elbow-lever carrying the brake, the connecting-rod $i$, and the lever L, pivoted in a slot in the main frame between the casing H H' and the saddle E, as set forth.

In testimony whereof I have signed my name in presence of two witnesses.

JOHN B. FUNK.

Witnesses:
F. P. D. MILLER,
A. J. WILSON.